United States Patent [19]

Durik

[11] Patent Number: 4,495,685
[45] Date of Patent: Jan. 29, 1985

[54] ROTARY TABLET MACHINE

[76] Inventor: Jeffrey R. Durik, 199 Ocean Ave., Lakewood, N.J. 08701

[21] Appl. No.: 415,127

[22] Filed: Sep. 7, 1982

[51] Int. Cl.³ .............................................. B23P 7/00
[52] U.S. Cl. ................................ 29/402.08; 29/402.06
[58] Field of Search ............ 29/402.08, 402.09, 402.11, 29/402.12, 402.14, 402.15, 402.17, 402.07, 402.06, 402.05, 402.04, 402.03, 402.02, 402.01, 403.1, 403.3, 401.1; 425/185, 186

[56] References Cited
U.S. PATENT DOCUMENTS 3,800,382  4/1974  Biggs .................................. 29/402.03
4,130,225  12/1978  Illes, Jr. ............................ 29/402.08

Primary Examiner—Howard N. Goldberg
Assistant Examiner—V. K. Rising
Attorney, Agent, or Firm—Paul J. Sutton

[57] ABSTRACT

The present invention teaches, without limitations, a method for replacing the worn out spindle of a rotary tablet press. This disclosure shows how the original rotary tablet press is reworked to remove the worn spindle. The method disclosed in this application enables the replacement spindle to allow the rotary tablet press to function in accordance with its original specifications. Rebuilding the rotary tablet press results in substantial savings when compared to purchasing a new tablet press.

9 Claims, 9 Drawing Figures

U.S. Patent   Jan. 29, 1985   Sheet 1 of 3   4,495,685
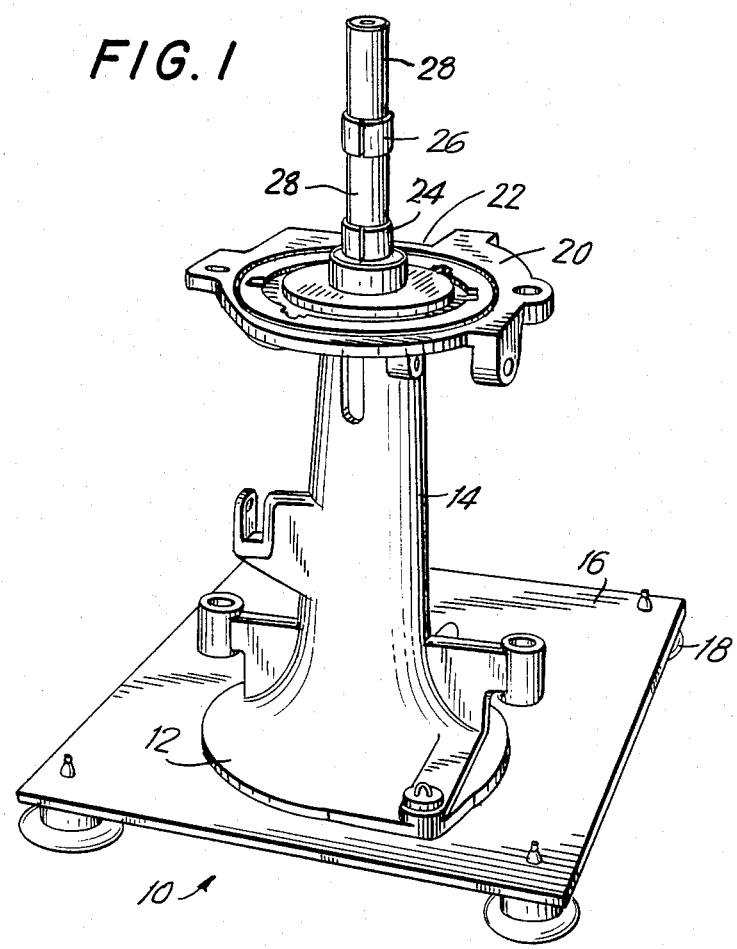
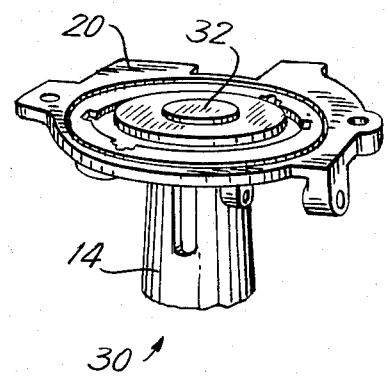
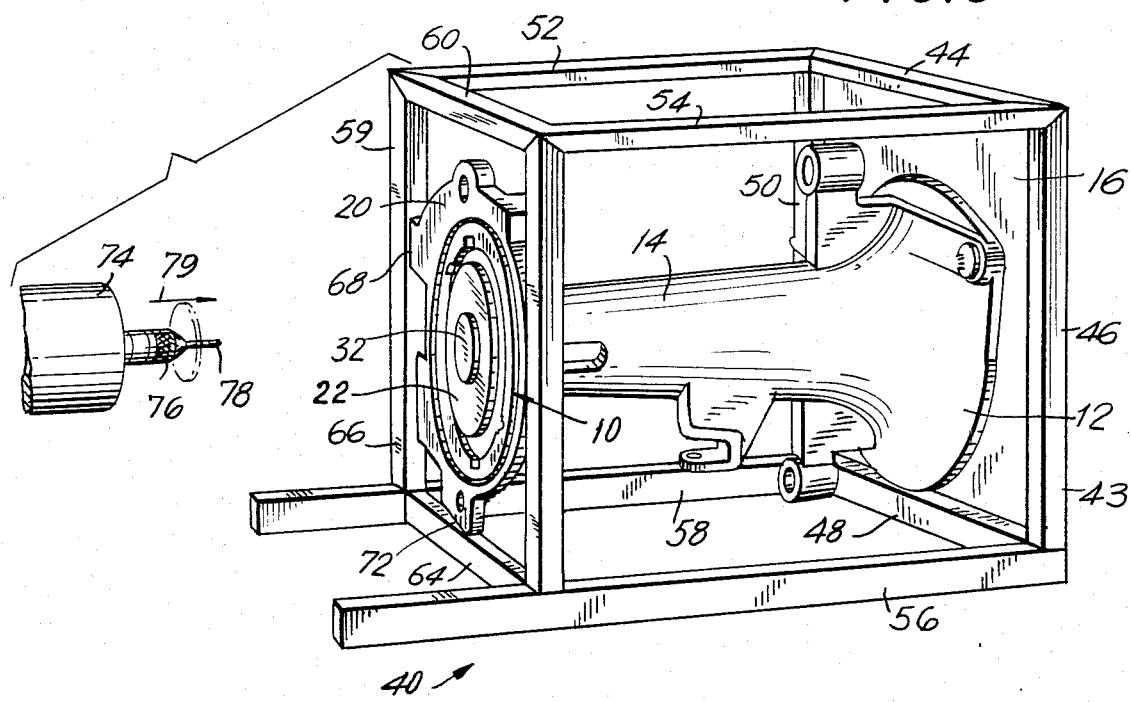

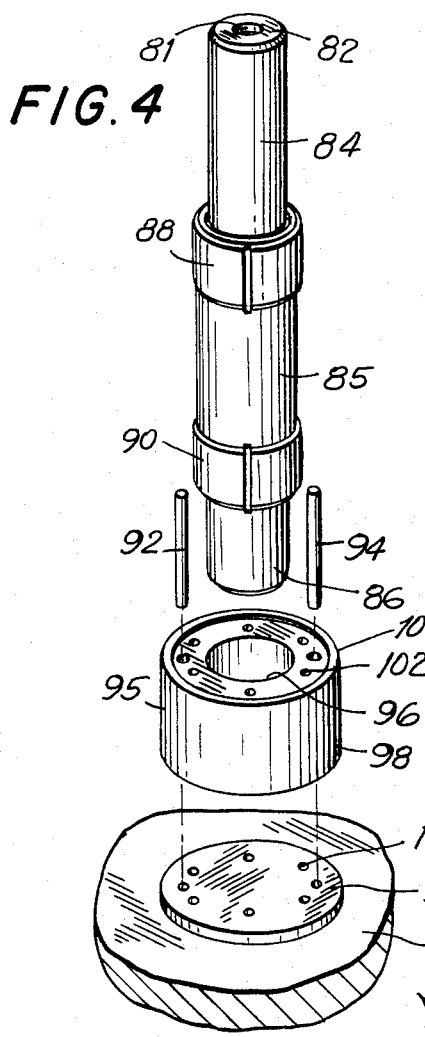
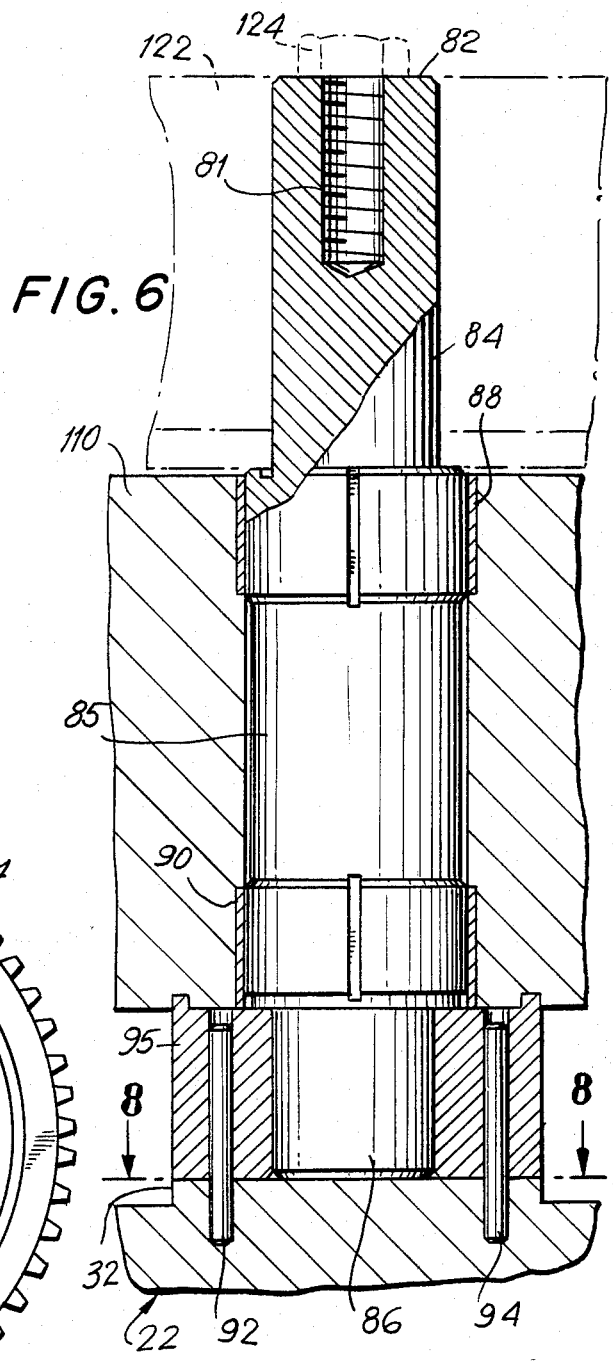
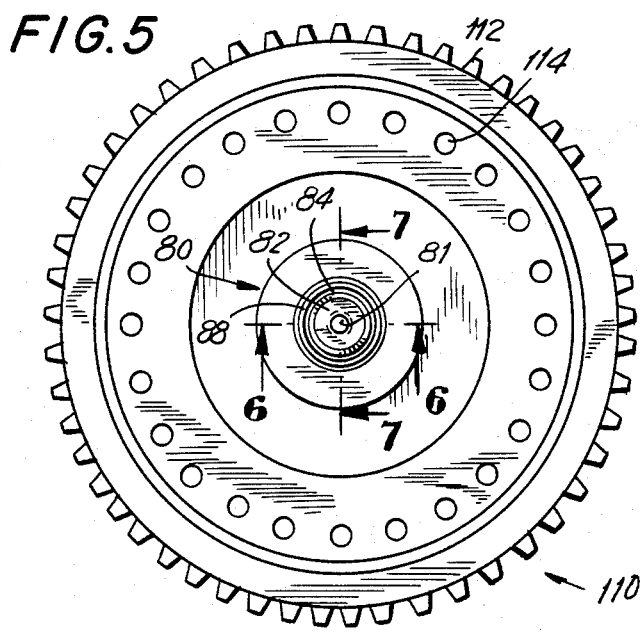

ROTARY TABLET MACHINE

BACKGROUND OF THE INVENTION

1. Field of the Invention:

This invention relates to rotary tablet machines in general. Specifically the rotary tablet machine of this disclosure is for use in the pharmaceutical field.

2. Description of the Prior Art:

Before the application of the method of this invention the pharmaceutical industry bought replacement rotary tablet presses when presses in use became worn. Attempts have been made to rebuild rotary tablet presses but the results have been questionable since the rebuilt machines have not generally met the original machine specifications.

The applicant has developed a method of rebuilding rotary tablet machines which results in a machine meeting, and in some cases exceeding, the original machine specifications.

Further, the manufacture of new machines and in some cases discontinued models require a casting in which the base and the shaft of a rotary tablet machine are cast as one piece. The foregoing results in an expensive and unwieldy casting. The method of the present invention whereby the shaft or spindle supporting the tablet die head is made separate from the base and attached to it after being machined, results in considerable savings of money and labor.

SUMMARY OF THE INVENTION

The primary object of the present invention is to provide for the reuse of a rotary tablet machine;

Another object of this invention is to provide for a rotary tablet machine which is less expensive when compared to costs of initial manufacture;

Still another object of this invention is to permit a rotary tablet machine to be operable for a longer period of time;

Yet another object of this invention is to increase the profitably of a rotary tablet machine;

A further object of this invention is to prevent the waste of tablet product due to worn parts;

Still a further object of this invention is to prevent the generation of heat which affects tablet quality;

Yet a further object of this invention is to provide for uniform table weights;

Still yet a further object of this invention is to reduce down time due to repair by only having to replace a worn or perishable part without the need to send the entire base casting off the premises for remachining.

BRIEF DESCRIPTION OF THE DRAWINGS

The foregoing and other objects, features and advantages of the present invention will become apparent from the detailed description hereinafter considered in conjunction with the accompanying drawings, wherein;

FIG. 1 shows a perspective view of a rotary tablet machine base before remanufacture;

FIG. 2 shows a portion of the top of a remanufactured rotary tablet machine base in accordance with the present invention;

FIG. 3 shows the rotary tablet machine base mounted in a fixture for machining of the top;

FIG. 4 shows details of the replacement spindle and associated fittings;

FIG. 5 shows a plan view of a rotary tablet die head;

FIG. 6 shows a section through 6—6 of FIG. 5;

DETAILED DESCRIPTION OF PREFERRED EMBODIMENT

Figure 7:
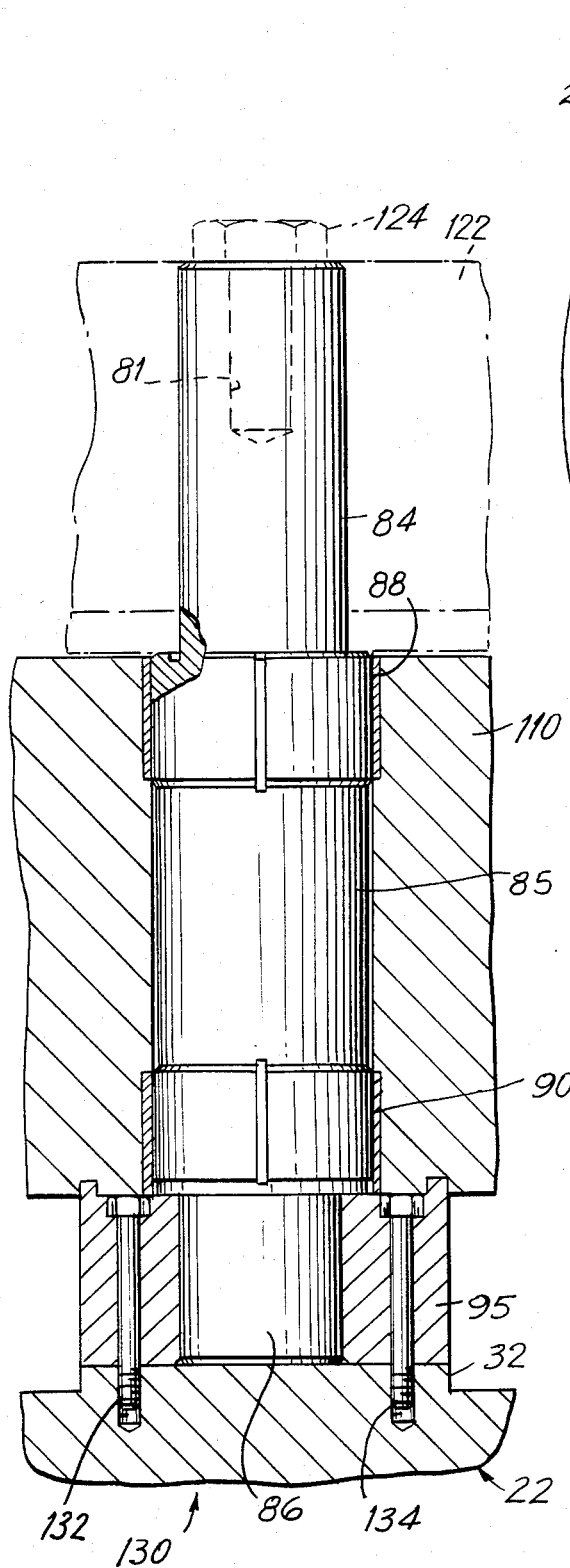
FIG. 7 shows a section through 7—7 of FIG. 5.

Referring, now, to FIG. 1 there is shown a rotary tablet machine 10 which is shown before its modification in accordance with this invention. The rotary tablet machine 10 is mounted on a mounting plate 16 in order to facilitate its modification. The mounting plate 16 has affixed to each corner a spacer 18 for convenience of handling the mounting plate 16. The rotary tablet machine 10 is temporarily attached to the mounting plate 16 at a base 12. The base 12 is normally cast integral with a pedestal 14 which supports, as an integral casting, a top surface 20. Centrally located on the top surface 20 and originally cast as an integral part thereof is a spindle 28. Spindle 28 has at the junction of the spindle 28 and the top surface 20 a base 22 which is integral with the spindle 28 and the top surface 20. At predetermined positions on the spindle 28 are located a lower brass bushing 24 and an upper brass bushing 26 for engagement with the part which fits onto the spindle 28.

FIG. 2 shows a top surface detail 30 which illustrates the top surface 20 and a portion of the pedestal 14. Best seen on top surface 20 is a truncated base 32 which is part of applicant's invention.

FIG. 3 illustrates a tablet machine mounted in base stand fixture 40. Base stand fixture 40 is comprised of a quadrilateral formed of a first lower member 44 joined at one end to a second lower member 46. The second lower member 46 is joined at an end remote from the first lower member 44 to a third lower member 48. The quadrilateral is completed by a fourth lower member 50. The foregoing forms a lower frame 43 of the base stand fixture 40.

Each of the corners of the lower frame 43 has a horizontal connection made to it. The result is that the top front corner of the lower frame 43 has joined to it one end of a first horizontal member 52. The top rear corner of the lower frame 43 has joined to it one end of a second horizontal member 54. Similarly the lower front corner of the lower frame 43 has joined to it one end of a third horizontal member 56 and the lower rear corner of the lower frame 43 has joined to it one end of a fourth horizontal member 58. The first and second horizontal members 54 and 56 are joined together by a first upper member 60 as shown in FIG. 3. Immediately below the first upper member 60 is a third upper member 64 joined to intermediate portions of the third horizontal member 56 and the fourth horizontal member 58. An upper frame 59 is completed by a fourth upper member 66 affixed between the first horizontal member 52 and the fourth horizontal member 58. A second upper member 62 affixed between the second horizontal member 54 and the third horizontal member 56 further completes the upper frame 59.

The base stand fixture 40 has been designed to facilitate the placement of the rotary tablet machine 10 onto a machine tool bed. The rotary tablet machine 10 which is attached to the mounting plate 16 is placed in the base stand fixture 42 by detachably attaching the mounting plate 16 to the lower frame 43. In order to locate the top surface 20 accurately, certain portions of the top surface 20 are allowed to abut portions of the upper frame 59. Therefore, it is seen in FIG. 3 that a first location point 68 is made to abut a portion of the fourth upper member 66. Similarly, a second location point 70 abuts a portion of the second upper member 62 and a third location point 72 abuts the third upper member 64. The base stand fixture 42 is further designed so that the axis of the spindle 28 which was formerly attached to the rotary tablet machine 10 is parallel to both the fourth horizontal member 58 and the third horizontal member 56. Therefore, when the base stand fixture 40 is fastened to the bed of the machine tool which is used to machine the truncated base 32 the movement of a machine arbor 74 will be parallel to the spindle 28 axis. The machine arbor 74 is shown having a drill chuck 76 mounted therein and a drill 78 contained within the chuck 76. The arbor 74 is capable of moving in the direction of an arrow 79 as shown in FIG. 3.

FIG. 4 illustrates a replacement spindle assembly 80. A replacement spindle 82 is seen having a spindle support bolt hole 81 at its uppermost portion. The upper portion of the replacement spindle 82 also has an upper diameter 84, best seen in FIG. 4. The replacement spindle 82 also has a mid-diameter 85 and a lower diameter 86. The mid-diameter 85 has affixed to the upper portion an upper replacement brass bushing 88 and affixed to the lower portion a lower replacement brass bushing 90. The lower diameter 86 engages an inner bore 96 found in a spindle base 95. The spindle base 95 also has an outer diameter 98 and a locating ridge 100. Also shown is a spindle base bolt and dowel cicuit 102 which coincides with a truncated base bolt and dowel circuit 104 found in the truncated base 32 which is part of the top surface 20. Consequently a first locating dowel 92 and a second locating dowel 94 will fit into corresponding holes as shown by the dashed lines from each dowel so as to ensure the correct placement of the spindle base 95 onto the truncated base 32.

FIG. 5 shows a rotary tablet die head assembly 110. What can best be seen is a die head drive gear 112 and a die circuit 114. The rotary die head assembly 110 is shown to be mounted onto the replacement spindle assembly 80.

FIG. 6 is a first section 120 through the die head assembly 110. Shown here are a support member 122 and a spindle bolt 124 which enters the spindle support bolt hole 81. Also seen are the upper diameter 84, the mid-diameter 85 and the lower diameter 86. The mid-diameter 85 has attached the upper replacement brass bushing 88 and the lower replacement brass bushing 90. The rotary tablet die assembly 100 is shown supported by the spindle 82 and the spindle base 95. The spindle base 95 is seen to be affixed to the truncated base 32 which is part of the top surface 20. Prominently shown is the first locating pin 92 and second locating pin 94.

FIG. 7 is a second section 130 through the die head assembly 110. Here is seen many of the features shown in FIG. 6. What is shown here is the manner of holding the spindle base 95 onto the truncated base 32. This is accomplished by means of six bolts similar to a first clamping bolt 132 and a second clamping bolt 134.

Figure 8:
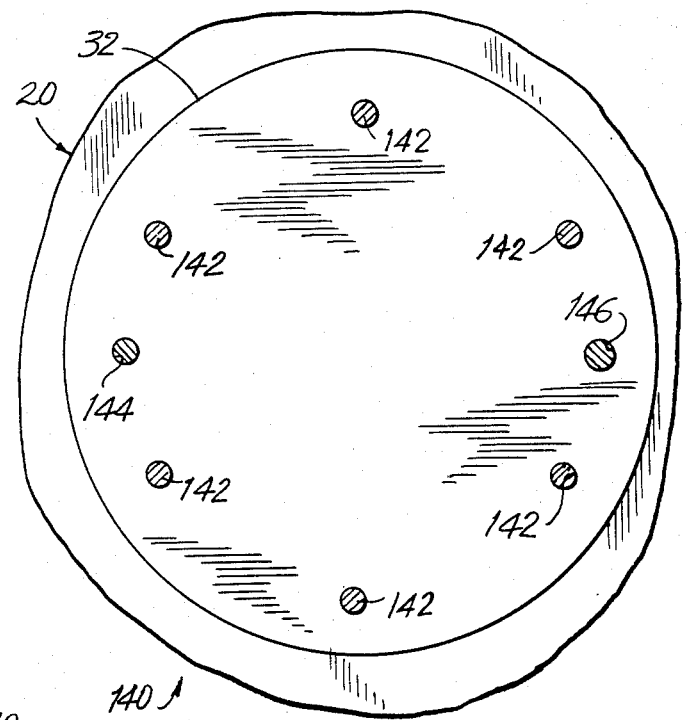
FIG. 8 shows a section 8—8 through FIG. 6 illustrating a first preferred bolt and locating pin arrangement.

FIG. 8 is a first bolt hole and dowel arrangement 140. The surface of the truncated base 32 is shown. Seen here is a first clamping bolt hole set 142 spaced substantially 60° apart. Diametrically opposite one another and mid way between the pair of adjacent bolt holes 142 is located the first locating dowel hole 144 and the second locating dowel hole 146. The locating dowels and the bolt holes are all placed on the same diameter circle. What is of interest here is that the first locating dowel hole 144 measures 5/16 of an inch in diameter and that the second locating dowel hole 146 measures ⅜ of an inch in diameter.

Figure 9:
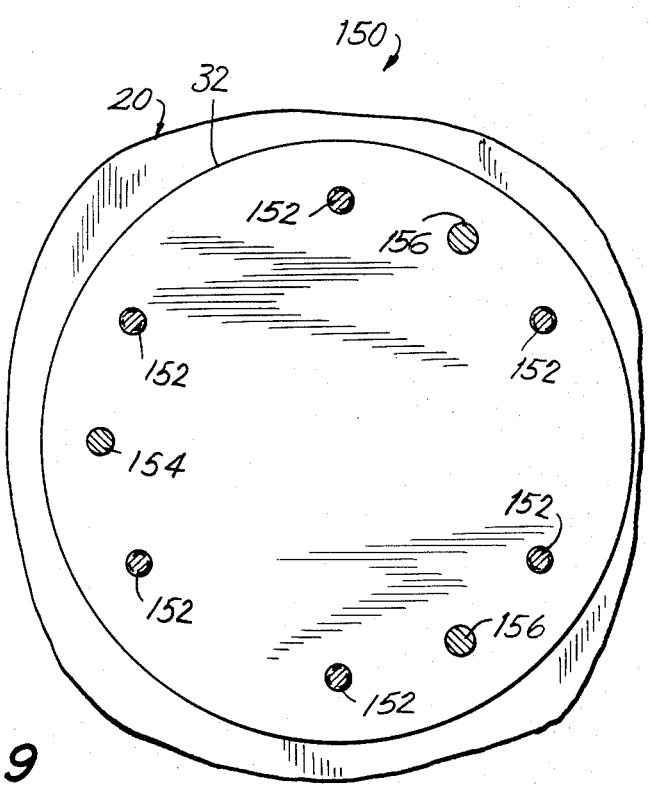
FIG. 9 shows a section 8—8 through FIG. 6 illustrating a second preferred bolt and locating pin arrangement.

FIG. 9 is a second bolt hole and dowel arrangement 150. Again the surface of the truncated base 32 is shown. Also seen is a second clamping bolt hole set 152 each bolt hole spaced substantially 60° from the next adjacent bolt hole. A third locating dowel 154 is placed midway between two adjacent bolt holes 152. Spaced 120° either side of the third locating dowel hole 154 is a pair of fourth locating dowel holes 156. All bolt holes and dowel holes are on the same diameter circle. Of interest in this Fig. is the fact that the third locating dowel hole 154 measures 5/16 of an inch in diameter whereas the fourth locating dowel hole pair both measure ⅜ of an inch in diameter.

OPERATION OF THE PREFERRED EMBODIMENT

FIG. 1 which is the rotary tablet machine 10 shows how the machine 10 is originally manufactured. Seen on the top surface 20 is the spindle 28. The spindle 28 and the top surface 20 are cast together as one piece as is the pedestal 14 and the base stand 12. The applicant has discovered and successfully developed a precedure for removing the spindle 28 from the top surface 20 and substituting the replacement spindle assembly 80. Rebuilding the rotary tablet machine 10 by using the replacement spindle assembly 80 lengthens the service life of the rotary tablet machine 10. The procedure herein disclosed is also useful during the original manufacture of the rotary tablet machine 10. Since the manufacturing cost can be lowered, whether the rotary tablet machine 10 is rebuilt or manufactured the procedure for practicing the present invention is the same.

The rotary tablet machine 10 which has been disassembled in the case of a machine to be rebuilt is mounted onto the mounting plate 16 for shop handling purposes as is shown in FIG. 1. FIG. 2 shows how the spindle 28 is cut off from a rotary tablet machine 10 being rebuilt. The material left as part of the truncated base 32 is sufficient to allow later machining so that the top surface of the truncated base 32 can be made parallel to the top surface 20. The top surface 20 may need to be machined to eliminate the effects of wear. In the case of a new machine the truncated base 32 portion is left with sufficient material to allow clean up of the casting.

In either case ie rebuilding or original manufacture the rotary tablet machine 10 is fitted into and attached to the base stand fixture 40. The base stand fixture 40 has been designed to align and support the rotary tablet machine 10 on the bed of the machine tool to be used. Although it is more difficult to align and fasten to a machine tool the rotary tablet machine 10 may be used without the base stand fixture 42. In either of the foregoing situations the rotary tablet machine 10 is aligned with respect to the drill press as illustrated in FIG. 3. The machine arbor 74 can also be fitted with a milling cutter (not shown), so as to enable the machining of the truncated base 32 and or the top surface 20. If the machine tool is of the milling machine type all machining can be performed without having to remove the rotary tablet machine 10 from the machine tool bed. Before machining any of the surfaces it is necessary to align the vertical axis of the rotary tablet machine 10 with that of the machine arbor 74. Use of the base stand fixture 42 facilitates such an alignment.

After machining the surface of the truncated base 32 the appropriate set of bolt holes and dowel holes are drilled. The combination selected will depend on the truncated base 32 diameter. The applicant has found that if the truncated base 32 diameter is 6" that the arrangement shown in FIG. 8 must be used. Alternately the applicant has found that if the truncated base 32 diameter is 8" the arrangement of FIG. 9 must be used.

Depending upon the diameter of the truncated base 32 the suitable spindle base 95 will have the corresponding hole pattern of FIG. 8 or FIG. 9 as the case may be. Assembly is accomplished by placing the appropriate dowel pins into the proper holes to ensure positioning of the spindle base 95 and then tightening the clamping bolts.

It must be noted here that the truncated base 32 contains threaded holes for the clamping bolts and that the spindle base 95 contains clearance holes for the clamping bolts.

After fastening of the spindle base 95 the replacement spindle 82 is assembled with the spindle base 95 by placing the lower diameter 86 into the inner bore 96 of the spindle base 95. The rotary tablet die head assembly 110 is then placed over the replacement spindle 82. By bolting the replacement spindle 82 to the support member 122 by means of the spindle bolt 124 rotation of the replacement spindle 82 in the inner bore 96 is prevented.

It is important here to emphasize that the novel procedure according to the present invention may be accomplished on relatively large bull-type and vertical lathes, with bolt patterns created by means of a transfer plate or drilling with radial/magnetic drilling. The arrangement illustrated in FIG. 4 may also be accomplished by means of a one-piece casting, and with or without dowels or locating pilots.

The embodiments of the invention particularly disclosed and herein above described are presented merely as examples of the invention; other embodiments, forms and modifications of the invention coming within the proper scope and spirit of the appended claims will of course readily suggest themselves to those skilled in the arts.

What is claimed is:

1. A method of reclaiming a rotary tablet machine, comprising:
   disassembling said rotary tablet machine;
   removing a spindle cast integral with a top surface of said machine except for a small raised portion of said spindle;
   machining said small raised portion to a predetermined dimension for forming a truncated base;
   providing locating means in said truncated base;
   fastening a spindle base having corresponding locating means to said truncated base;
   inserting a replacement spindle into said spindle base; and
   reassembling said rotary tablet machine, whereby said machine will operate as said rotary tablet machine.

2. The method of claim 1 wherein said truncated base is 6 inches in diameter.

3. The method of claim 1 wherein said truncated base is 8 inches in diameter.

4. The method of claim 2 wherein said locating means comprise a hexagonal pattern of threaded holes disposed about a predetermined diameter, further disposed among said threaded holes is a plurality of dowel holes.

5. The method of claim 4 wherein said predetermined diameter is 4.182 inches.

6. The method of claim 5 wherein said plurality of dowel holes consists of a 5/16 inch diameter hole diametrically opposite a ⅜ inch diameter hole.

7. The method of claim 3 wherein said locating means comprise a hexagonal pattern of threaded holes disposed about a predetermined diameter, further disposed around said threaded holes is a plurality of dowel holes.

8. The method of claim 7 wherein said predetermined diameter is 6.750 inches.

9. The method of claim 8 wherein said plurality of dowel holes consists of three holes spaced 120° from each other, two adjacent of said holes being ⅜ inch in diameter and the remaining one of said holes being 5/16 inch in diameter.

* * * * *